Figure 1:
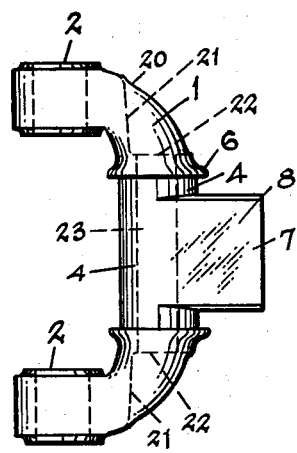

May 12, 1936.     B. H. URSCHEL     2,040,577

TUBULAR AXLE

Filed March 12, 1935

Inventor

Bertis H. Urschel

By *[signature]*
            Attorney

Patented May 12, 1936

2,040,577

UNITED STATES PATENT OFFICE 2,040,577

TUBULAR AXLE

Bertis H. Urschel, Bowling Green, Ohio

Application March 12, 1935, Serial No. 10,661

2 Claims. (Cl. 301—124)

My invention has for an object to provide a tubular axle having efficient means of connection to the stub axle of the front wheels of automobiles, trucks, and the like.

My invention particularly provides for integrally uniting yokes in the ends of a tubular axle member to form stub axle steering knuckles that will sustain the changing load and torsional strains transmitted between the wheels and the main axle member when supporting a self-propelled vehicle.

The invention also has for its object other features and advantages that render the use of tubular axles applicable to the needs of present day trucks and automobiles and which will appear from the following description and upon examination of the drawing.

The invention may be contained in axle constructions that vary in their details, and to illustrate a practical application of the invention I have selected an axle containing the invention as an example of the various constructions that embody the invention and shall describe it hereinafter. The axle selected and having the yoke connection of my invention is shown in the accompanying drawing.

Figure 2:
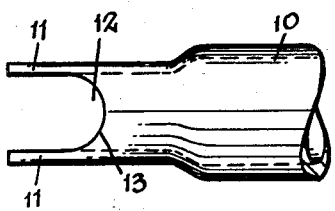
Figure 4:
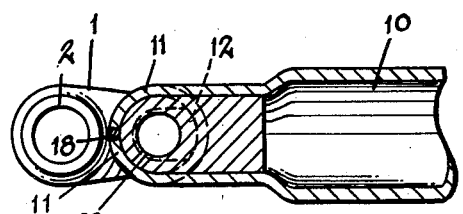
Figure 3:
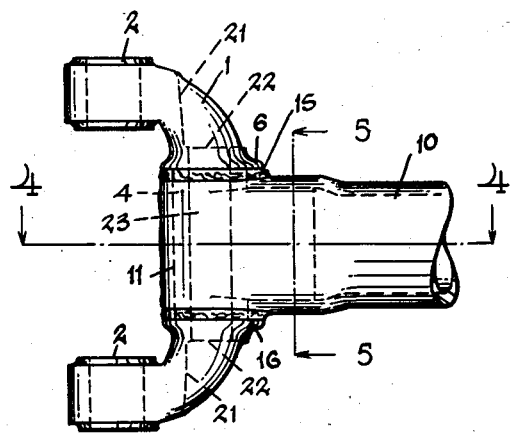
Figure 5:
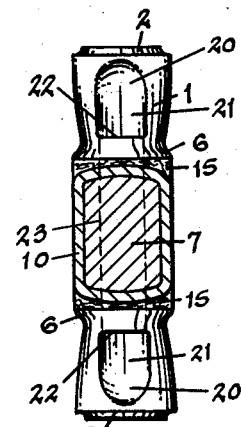

Fig. 1 is a side view of the yoke member. Fig. 2 is a view of one end of a tubular axle. Fig. 3 is a side view of the yoke member and end part of the axle. Fig. 4 is a view of a section taken along the plane of the line 4—4 shown in Fig. 3. Fig. 5 is a view of the section taken along the plane of the line 5—5 shown in Fig. 3.

As is well known, tubular axles have a greater load sustaining strength per unit of weight than other forms of axle construction, and, due to their cylindrical shape, possess a maximum torque resisting power rendering them more efficient than other axle constructions for use with self-propelled vehicles.

In the form of construction shown in the drawing the ends of each yoke 1 are bored, as at 2, and are adapted to receive and form a bearing or a support for a king pin or other stub axle or wheel connecting part. Each yoke member may be shaped to have a greater cross-sectional area at the point of connection with the tubular axle than at points more remote from the axle, and the central cylindrical portion 4 may be provided with flanges 6 for the transmission of load strains to the tubular axle. The flanges are preferably formed to extend over the edges of portions of the axle when the axle and yoke are assembled, constituting an efficient means for the transmission of load strains.

In order that the yokes may be secured in the ends of the tube, the central cylindrical portions 4 of the yokes are provided with parts having parallel lateral surfaces. If desired, the central parts may protrude from the body of each yoke to form the projecting part 7 having parallel plane lateral surfaces 8 tangential to the cylindrical surfaces of the central portion 4. The projecting part 7 is substantially rectangular in cross-section having plane sides and curved tops and bottoms. The cylindrical central portion of the yoke and the centrally projecting part 7 are adapted to fit the interior surfaces of the shaped and cut ends of the tubular axle 10.

The ends of the axle are slotted, and the portions 11 between the slots are flattened leaving the parts of the axle contiguous to the flattened portions and the slots cylindrical. Parts of the ends are cut out, as at 12 to form semi-circular edge portions 13 that fit the cylindrical central portions of the yokes. If desired, the wall parts of the ends of the tube may be thickened by any suitable means in advance of cutting the slots. Also, if desired, the end portions may be reduced in size as measured transversely.

The rectangular parts 7 are inserted into the shaped ends of the axle and may project into the axle any desired length.

When the projecting parts 7 are inserted in the end of the axle, the thickness of the walls of the ends of the axle is such as to form a space between the top and bottom surfaces of the ends of the axle and the flanges 6 in which suitable welding material may be located as at 15. The portions 11 are bent around the cylindrical central portions of the yokes 4, the length of the portions 11 preferably being such as to dispose the end edges in spaced relation to form a space for welded material, as at 18. Thus, when the parts are assembled and welded together, there is produced an exceedingly rigid structure for the transmission of torsional and vertical load strains from the front wheels to the axle.

The yokes 1 are provided with recesses 20 having the curved surface 21 and the flat surfaces 22 extending at right angles to the axes of the cylinder portions 4 of the yokes. The yokes are bored to form the openings 23 which reduces the weight of yokes and also provides for the introduction of a cooling medium, such as water or oil, into the interior of the yokes and within the confines of the end parts 11 to produce cooling of the interior of the yokes and the ends of the tube as the outer surfaces of the parts 11 are cooled.

This produces and maintains an accurate fitting between the surfaces of the yoke and the counteracting parts of the tube during and after the completion of heat treatment of the axle which is necessary to harden the bearings and thereby produce the same contraction of these parts and accurate fitting of all parts of the contiguous surfaces notwithstanding an irregularity of surface that may exist prior to the heat treatment.

I claim:

1. In a tubular steel structure, steel yoke-shaped members having arms extending curvedly from central parts of the said members, the central parts having curved surfaces, a tubular steel member having slots formed in opposite sides of the end parts of the tubular member, the said central parts substantially fitting in the slots and the portions of the end parts between the slots, the end parts of the said portions bent around and substantially fitting and enclosing the said central parts and welded to the yoke members along the edges of the said portions, the yoke members having openings extending through the said central parts and in a direction crosswise the tubular member for admission of chilling fluid within the said central parts upon heat treatment of the connected yoke members and the tubular member for producing intimate contact and fitting between the surfaces of the end portions of the tubular member and the central parts of the yoke members.

2. In a tubular steel structure, steel yoke-shaped members having arms extending curvedly from central parts of the said members, the said central parts having curved surfaces, a tubular steel member having slots formed in opposite sides of end parts of the tubular member, the said central parts substantially fitting in the slots and the portions of the end parts between the slots, the end parts of the said portions bent around and substantially fitting and enclosing the said central parts and welded to the yoke members along the edges of the said portions, the yoke member having openings extending through parts of the arms and the central parts of the yoke members in a direction crosswise the tubular member for admission of chilling fluid upon heat treatment of the connected tubular member and yoke members for producing intimate contact and fitting between the contiguous surfaces of the end portions and the said central parts of the yoke members.

BERTIS H. URSCHEL.